(12) United States Patent
Olejak

(10) Patent No.: US 10,088,065 B2
(45) Date of Patent: Oct. 2, 2018

(54) CHECK VALVES AND FLAPPER ARRANGEMENTS THEREFOR

(71) Applicant: Hamilton Sundstrand Corporation, Charlotte, NC (US)

(72) Inventor: Jacek Olejak, Bestwinka (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/405,571

(22) Filed: Jan. 13, 2017

(65) Prior Publication Data
US 2017/0204981 A1     Jul. 20, 2017

(30) Foreign Application Priority Data
Jan. 15, 2016   (EP) .................................. 16461504

(51) Int. Cl.
  F16K 15/03    (2006.01)
  F16K 47/00    (2006.01)
  F16K 27/02    (2006.01)

(52) U.S. Cl.
  CPC ........ F16K 15/038 (2013.01); F16K 27/0209 (2013.01); F16K 47/00 (2013.01); Y10T 137/7839 (2015.04)

(58) Field of Classification Search
  CPC .... F16K 15/038; F16K 47/00; F16K 27/0209; Y10T 137/7839
  USPC ..................................................... 137/512.1
  See application file for complete search history.

(56) References Cited

U.S. PATENT DOCUMENTS

| 8,757,156 B2 | 6/2014 | Martin et al. |
| 8,844,563 B2 * | 9/2014 | Hawa ........................ F16K 1/22 137/512.1 |
| 2005/0189024 A1 | 9/2005 | Dippel et al. |
| 2008/0078459 A1 | 4/2008 | Warriner et al. |

FOREIGN PATENT DOCUMENTS

| EP | 2500609 A1 | 9/2012 |
| GB | 2493038 A | 1/2013 |
| JP | S50105924 U | 8/1975 |
| JP | S5536689 U | 3/1980 |

(Continued)

OTHER PUBLICATIONS

European Search Report for Application No. 16461504.9-1751, dated Jul. 20, 2016, 8 PAGES.

*Primary Examiner* — Kevin Lee
(74) *Attorney, Agent, or Firm* — Cantor Colburn LLP

(57) ABSTRACT

A check valve comprises a valve housing defining a pair of valve openings, a pair of flappers pivotably mounted for rotation relative to the housing between an open position in which they permit fluid flow through the respective valve openings and a closed position in which they prevent fluid flow through the valve openings, and a stop pin extending across the valve such that the flappers will contact the stop pin in their open positions. Each flapper comprises a primary flapper element and a secondary flapper element, each pivotally mounted to a hinge pin extending across the valve. The primary flapper element further comprises a flapper opening formed therethrough. The secondary flapper element is pivotally mounted to the hinge pin such that it may rotate relative to the primary flapper element for opening or closing the flapper opening.

13 Claims, 6 Drawing Sheets

(56) References Cited

FOREIGN PATENT DOCUMENTS

| | | |
|---|---|---|
| JP | S58157074 U | 10/1983 |
| JP | S63135668 A | 6/1988 |
| JP | H10141525 A | 5/1998 |
| JP | H10318387 A | 12/1998 |

\* cited by examiner

CHECK VALVES AND FLAPPER ARRANGEMENTS THEREFOR

This application claims priority to European Patent Application No. 16461504.9 filed Jan. 15, 2016, the entire contents of which is incorporated herein by reference.

TECHNICAL FIELD

The present disclosure relates to check valves.

BACKGROUND

Check valves are valves that allow fluid flow in one direction therethrough and prevent flow in the opposite direction. They are widely used in a range of applications, for example in air conditioning systems, for example in aircraft air conditioning systems.

Check valves commonly include a pair of valve elements or flappers located at an opening in a valve housing. The flappers are hingedly supported on a hinge pin mounted to the valve housing for rotation between a closed position in which they lie across and close the opening, preventing fluid flow through the opening in one direction and an open position in which, under the pressure of a fluid (gas or liquid) on one side of the check valve, the flappers rotate from their closed positions so as to allow the fluid to flow through the valve in the opposite direction.

In known check valve arrangements, a stop is provided to limit the rotational movement of the flapper elements as they open. Typically, the stop comprises a stop pin which is mounted to posts arranged on opposed sides of the valve housing opening. The stop pin is spaced from the opening such that when the flappers open, they engage the stop pin.

The flapper elements may impact the stop pin with some considerable force, meaning that the stop pin and the flapper elements themselves must be sufficiently robust to withstand the impact forces. This may mean that the stop pin and the flapper elements may have to be relatively heavy, which may have implications for example in aircraft applications.

The present disclosure relates to a check valve which includes a modified flapper element construction.

SUMMARY

There is disclosed herein a check valve which comprises a valve housing defining a pair of valve openings and a pair of flappers pivotably mounted relative to the housing for rotation between an open position in which they permit fluid flow through the respective openings and a closed position in which they prevent fluid flow through the openings. The check valve further comprises a stop element arranged such that the flapper elements will contact the stop element in their open positions. Each flapper comprises a primary flapper element pivotally mounted to a hinge pin extending across the valve, and at least one secondary flapper element. The primary flapper element has at least one flapper opening formed therethrough. The at least one secondary flapper element is pivotally mounted such that it may rotate relative to the primary flapper element for opening or closing the at least one flapper opening in the primary flapper element.

In one embodiment, the at least one secondary element (24) may be also pivotally mounted to the hinge pin.

The primary and secondary flapper elements may therefore be provided with mounting lugs for mounting the elements to the hinge pin.

In an alternative embodiment, however, the least one secondary flapper element may be pivotally mounted to the primary flapper element.

In various embodiments, the stop element may comprise an element, such as a stop pin, extending across the valve between mounting posts.

In such an arrangement, both the hinge pin and the stop element may be mounted between the mounting posts.

In alternative embodiments, the stop element may comprise an element mounted to and extending away from a central region of a web of the valve housing extending between the valve openings.

The flapper may comprise just a single flapper opening and secondary flapper element closing the flapper opening. Alternatively, the flapper may comprise multiple flapper openings and/or secondary flapper elements.

The secondary flapper element(s) may be constructed so as to engage with a surface of the primary flapper element around the flapper opening(s) to close the flapper opening (s).

The secondary flapper element(s) may be a generally planar or plate-like element(s).

The flapper opening(s) may be generally rectangular in shape. The secondary flapper element(s) may therefore also be generally rectangular in shape.

The secondary flapper element(s) may be thinner than the primary flapper element.

The primary and secondary flapper elements may be formed from the same material.

The flapper opening may be offset from the centre of the primary flapper element in a direction towards the hinge pin.

The disclosure also extends to a check valve flapper comprising a primary flapper element and at least one secondary flapper element, the primary and secondary flapper elements having mounting lugs for pivotally mounting the elements to a common hinge pin, the primary flapper element having at least one flapper opening formed therethrough, the at least one secondary flapper element being configured to be rotatable relative to the primary flapper element and to cooperate with the primary flapper element to close the at least one flapper opening in one relative rotational position.

The disclosure also extends to a check valve flapper comprising a primary flapper element having mounting lugs for pivotally mounting the element to a hinge pin, and at least one secondary flapper element, the primary flapper element having at least one flapper opening formed therethrough, and the at least one secondary flapper element being pivotally mounted to the primary flapper element so as to cooperate with the primary flapper element to close the at least one flapper opening in one relative rotational position.

The flapper may include any of the additional features described above.

An embodiment of the disclosure will now be described by way of example only with reference to the accompanying drawings in which:

DETAILED DESCRIPTION

Figure 1:
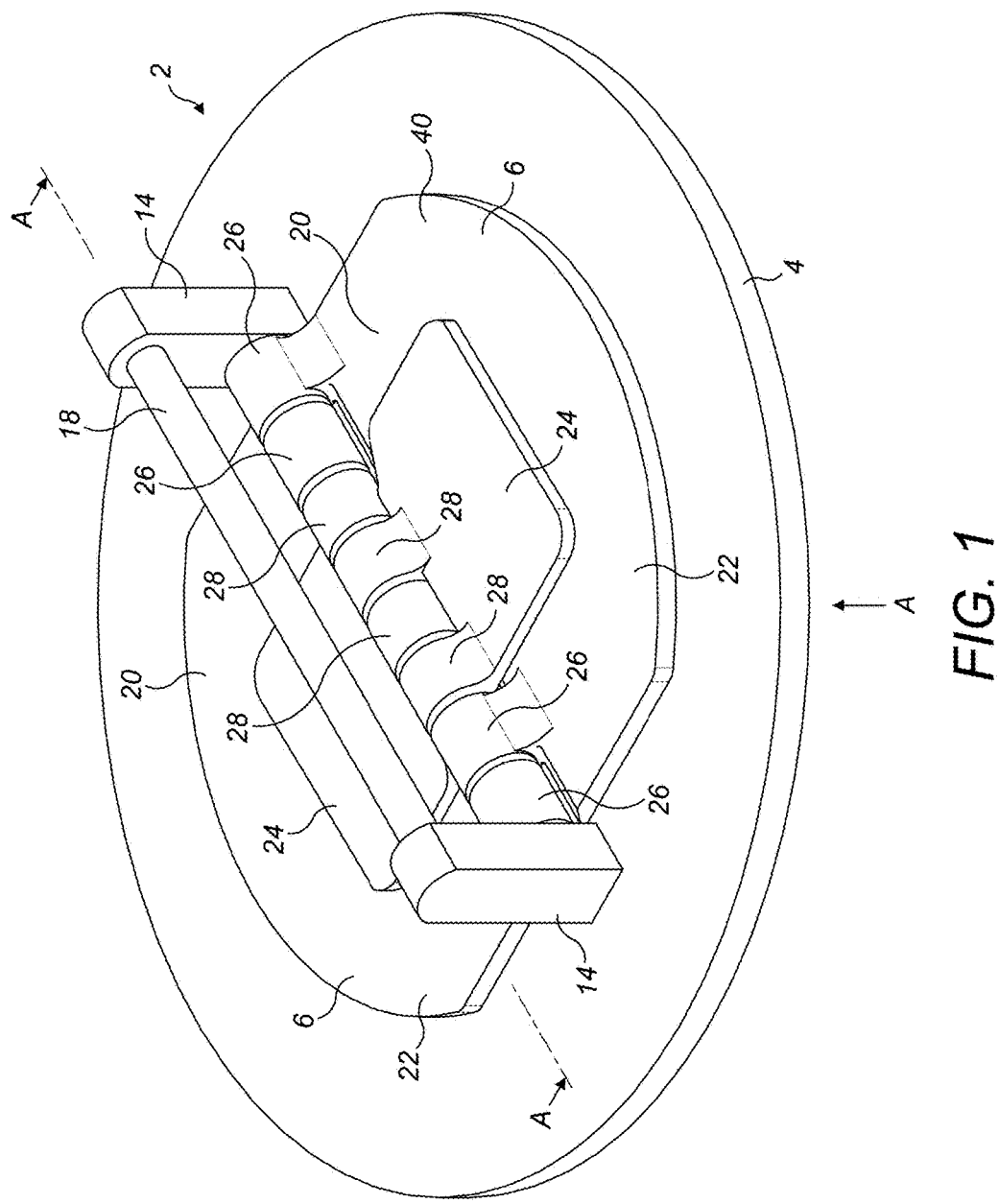
FIG. 1 shows a perspective view of an embodiment of check valve in accordance with this disclosure, in a closed configuration.

A first embodiment of check valve 2 in accordance with this disclosure is illustrated in FIGS. 1 to 5.

The check valve 2 comprises a valve housing 4. The valve housing 4 is a generally planar annular element which in use may be mounted in a pipe, duct or the like. The valve housing 4 comprises a pair of generally D-shaped valve openings 6 which are separated by a central web 8 of the valve housing 4. The lower surface 10 of the valve housing 4 is provided with a recess 12 around the apertures 6a, 6b, for weight saving purposes, although this is not essential.

A pair of mounting posts 14 extend upwardly from the valve housing 4. The mounting posts 14 may be integrally formed, for example cast, with the valve housing 4. Alternatively, the mounting posts 14 may be separately formed from the valve housing and mounted thereto by suitable means.

A hinge pin 16 is mounted between the mounting posts 14 above the central web 8. The hinge pin 16 may be a unitary structure as shown, or be constituted from two or more sections. A stop element in the form of a stop pin 18 is also mounted between the mounting posts 14, above the hinge pin 16. The term pin as used herein does not imply any particular shape or dimension. For example, while the stop pin 18 is shown as circular in cross section, it could have other cross sectional shapes. It also encompasses multi-part constructions as well as unitary constructions.

The valve openings 6 are closed by a pair of generally D-shaped flappers 20 which are pivotally mounted to the hinge pin 16. Each flapper 20 comprises a primary flapper element 22 and a secondary flapper element 24. The primary flapper element 22 and the secondary flapper element 24 are separately pivotally mounted to the hinge pin 16. Each primary flapper element 22 has a pair of primary mounting lugs 26 arranged one on either side of the associated secondary flapper element 24. Each secondary flapper element 24 has a pair of secondary mounting lugs 28. The secondary mounting lugs 28 of the two secondary flapper elements 24 are arranged in an alternating fashion along the hinge pin 16.

Each primary flapper element 22 is generally planar and is D-shaped in shape. The lower surface 30 of each primary flapper element 22 is formed with a peripheral lip 32 which is configured to engage around the periphery of the associated valve housing opening 6 when the valve 2 is closed.

A flapper opening 34 is formed through a central region 36 each primary flapper element 22. In this embodiment, the flapper opening is generally rectangular in shape, but other shapes of flapper opening 34, for example circular, oval or ellipsoidal, are contemplated within the scope of the disclosure. The flapper opening 34 is positioned generally centrally between the sides of each primary flapper element 22, between the mounting lugs 26 of the primary flapper element 22, but is offset from the centre of the primary flapper element 22 in a direction towards the hinge pin 22 or mounting lugs 26. The stresses in this region of the primary flapper element 22 will be relatively low.

Each secondary flapper element 24 is generally planar or plate-like in shape. It has a lower surface 38 which is shaped complementarily to the upper surface 40 of the associated primary flapper element 22 at least around the flapper opening 34 so as to be capable of closing the flapper opening 34 when the secondary flapper element 24 is received on the upper surface 40 of the primary flapper element 22. In an alternative embodiment, the secondary flapper element 24 may at least partially enter the flapper opening 34.

In this embodiment, the secondary flapper element 24 is of the same order of thickness as the primary flapper element 22, or at least as the central region 36 of the primary flapper element 22. It may, however, depending on the particular application be thinner than the primary flapper element 22 or even thicker. However, due to their size, the mass of the secondary flapper elements 24 and their moments of inertia about the hinge pin 16 will be significantly lower than the mass of the primary flapper elements 22 and their moments of inertia about the hinge pin 16.

In this embodiment, the primary and secondary flapper elements 22, 24 may be formed of the same material. The material chosen will depend on the particular application. For example, in low temperature and/or pressure applications, an aluminium alloy may be a suitable material. For higher temperature and/or temperature applications, a steel, such as a nickel steel (for example Inconel®) or a stainless steel may be appropriate. Similar materials may be used for the valve housing 4 and mounting posts 14.

Although the construction of the check valve 2 may appear to be more complex than a simple check valve having unitary flappers 20, the two-part flapper construction illustrated has advantages over such arrangements. As explained in the background section above, when a pressure differential is applied across a check valve in a valve opening direction, the flappers 20 will pivot and when fully opened will impact the stop pin 18. This will subject the stop pin 18 and the flappers 20 to significant impact forces so that the flappers 20 may have to be relatively heavy to withstand the impact forces.

However, splitting the flapper 20 into primary and secondary elements 22, 24 mitigates this problem, as will be understood from the discussion below.

Figure 2:
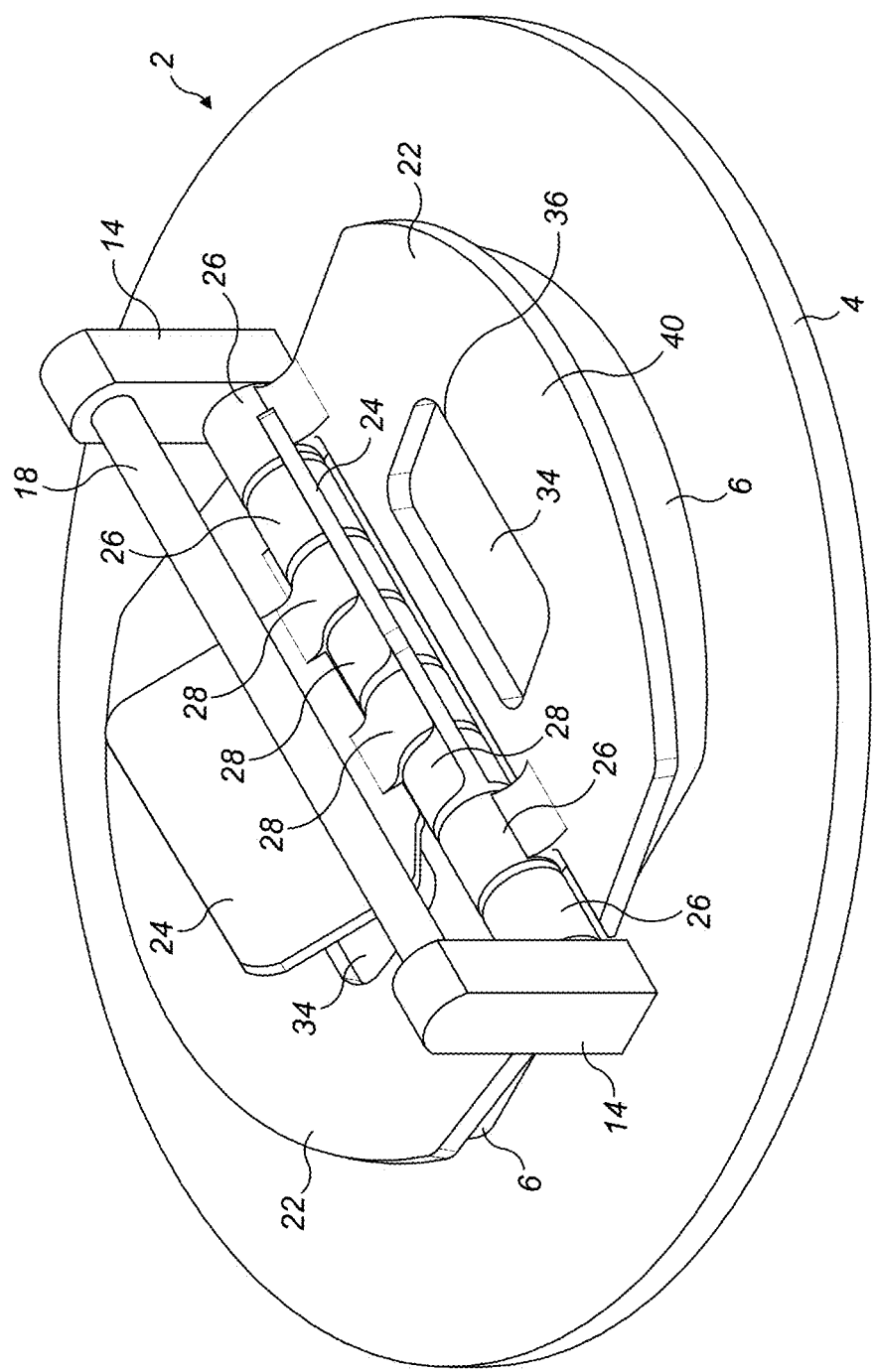
FIG. 2 shows the check valve of FIG. 1 in a partially opened configuration.

When an opening pressure differential is applied to the check valve 2 in an opening direction A, the secondary flapper elements 24 will start to pivot around the hinge pin 16 before the primary hinge flapper elements 22, due to their lower mass and inertia. This is illustrated in FIG. 2. The rotation of the secondary flapper elements 24 relative to the primary flapper elements 22 will begin to open the flapper openings 34. This has the effect of reducing the relative pressure acting on the primary flapper elements 22, as in effect, some of the fluid flow is vented through the flapper openings 34. This in turn means that the primary flapper elements 22 will pivot less quickly than in a unitary construction.

Figure 3:
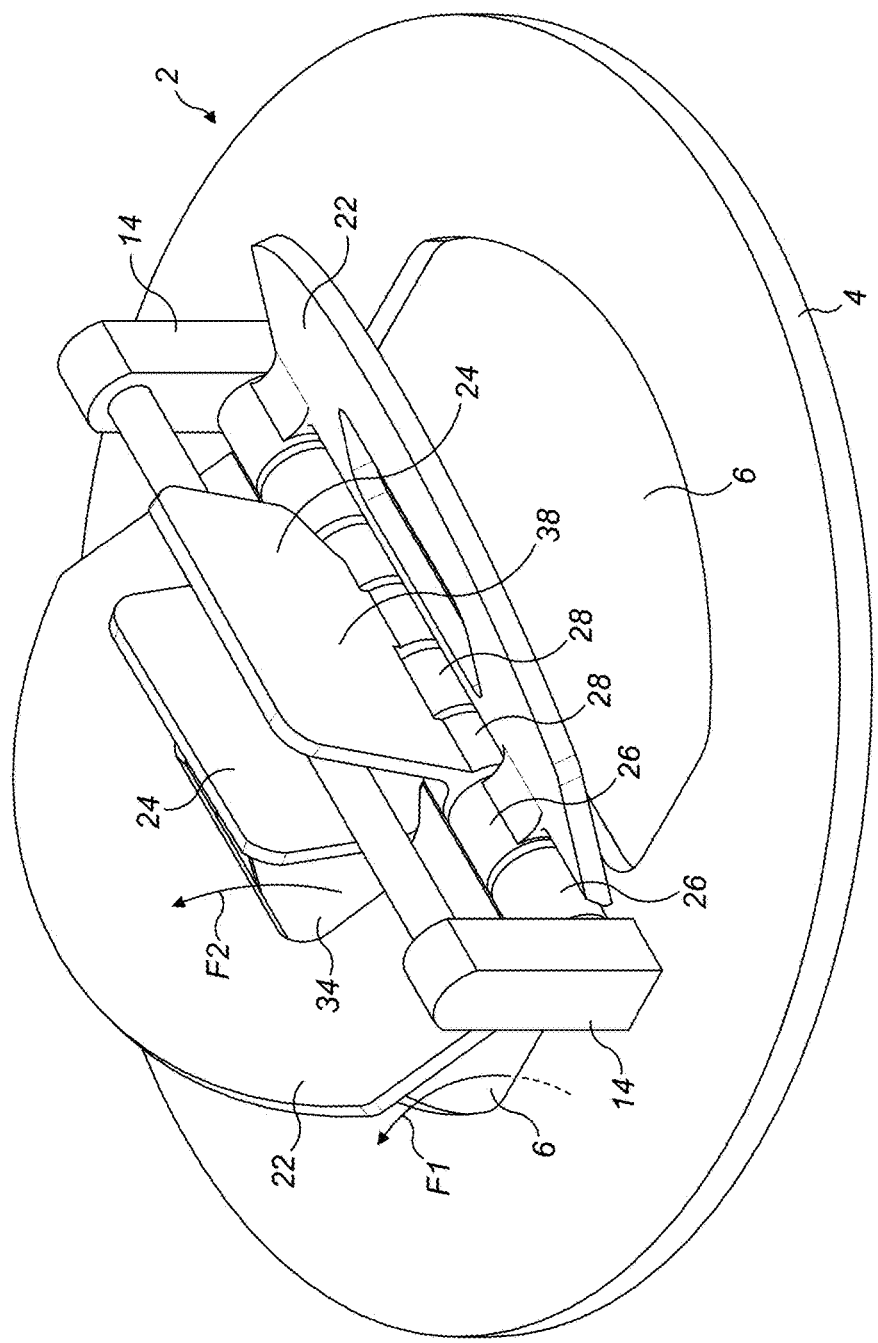
FIG. 3 shows the check valve of FIG. 1 in a further partially open configuration.
Figure 4:
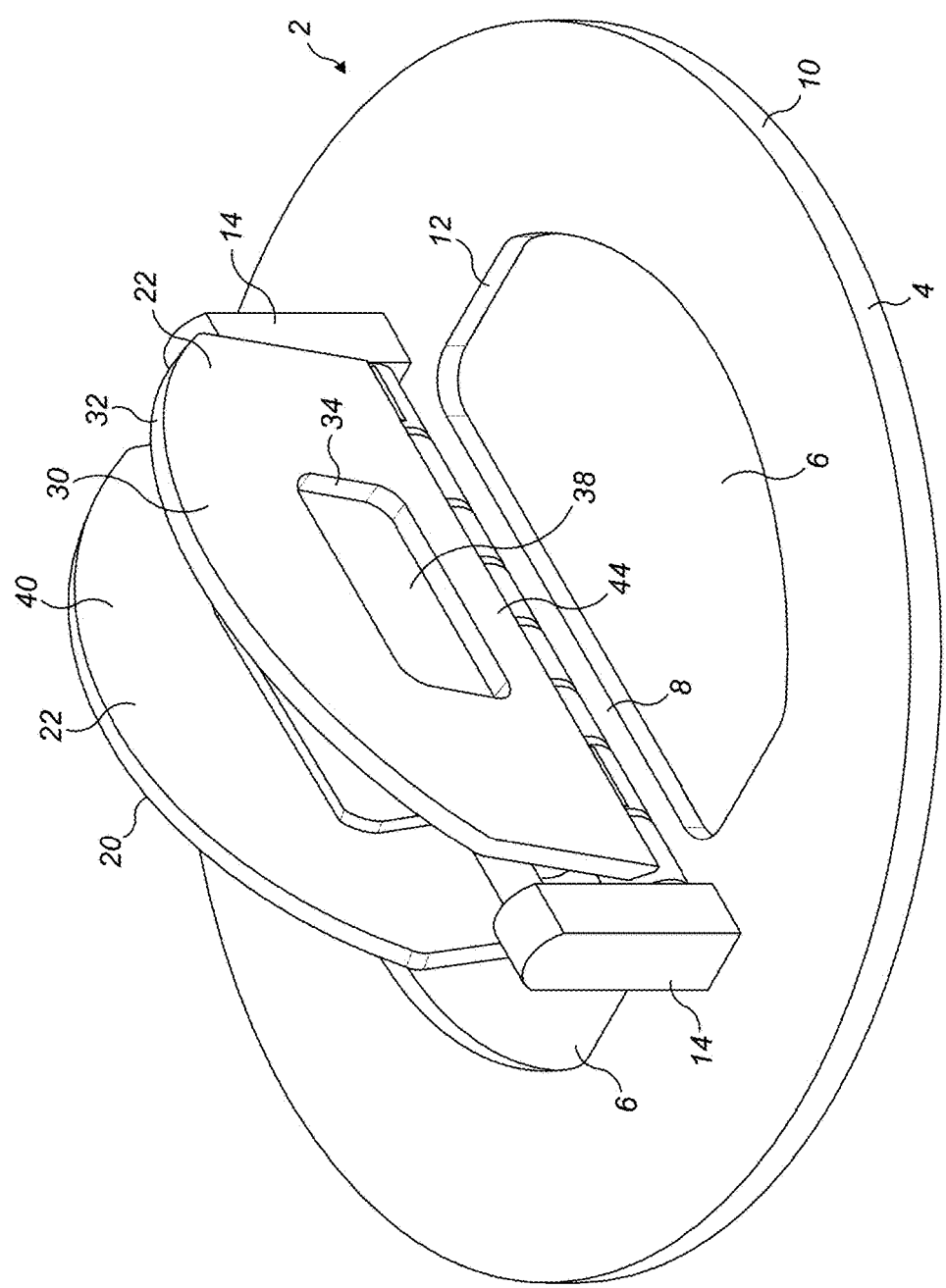
FIG. 4 shows the check valve of FIG. 1 in a fully open configuration.
Figure 5:
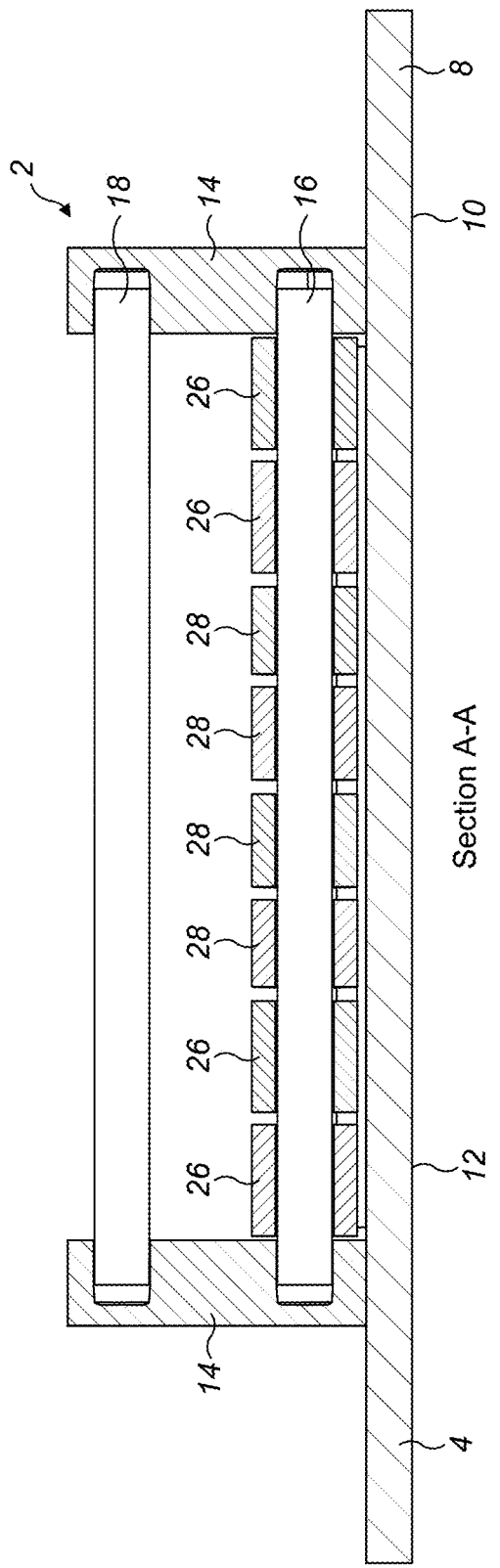
FIG. 5 shows a sectional view along the section line A-A of FIG. 1.

The secondary flapper elements 24 will continue to rotate until they impact the stop bar 18, as illustrated in FIG. 3. In this position, the primary flapper elements 22 are have not yet reached their fully open positions. They will continue to rotate until they impact the now fully opened secondary flapper elements 24. However, due to the reduced rotational velocity, mass and inertia of the primary flapper elements 22 the impact forces will be reduced.

Moreover, as can be seen from FIG. 3, the fluid flow through the check valve 2 is split into two flows F1 and F2. The flow F2 is through the flapper opening 34 and between the primary and secondary flapper elements 22, 24. The flow F2 acts as a cushion between the primary and flapper elements 22, 24, thereby acting further to reduce the impact of the primary flapper element 22 on the secondary flapper element 24.

Thus, due to the reduced impact forces experienced by the flappers 20, they may be made lighter than prior flappers 20, even though they may be in two parts. Also, the stop bar 16 and the mounting posts 14 may also be made less robust and therefore lighter than in prior constructions.

Also, by employing a secondary flapper the check valve may be able to open at a lower pressure differential, or cracking pressure across the valve, which may be desirable in some applications.

It will be appreciated that the flapper element construction disclosed herein may be employed in new valve constructions, and potentially also in the refurbishment or repair of existing check vales where the prior unitary flappers may be replaced with the new construction.

It will also be understood that the above is a description of just one possible embodiment of the disclosure and that modifications may be made thereto without departing from the scope of the disclosure.

For example, in the embodiment described above, the primary flapper element 22 is provided with just a single flapper opening 34, more than one flapper opening 34 may be provided in each primary flapper element 22. A single secondary flapper element 24 or more than one secondary flapper element 24 may be arranged to close the flapper openings 34. Multiple flapper openings 34 and/or secondary flapper elements 24 may be more suited to larger check valves.

In addition, while the primary and secondary flapper elements 22, 24 have been illustrated as each having two mounting lugs 26, 28, they may be provided with, one or both may, for example, have more lugs, for example three mounting lugs 26, 28.

In the described embodiment, the primary and secondary flapper elements 22, 24 are pivotally mounted to the same hinge pin 16. In an alternative embodiment, however, the secondary flapper element 24 may be pivotally mounted to the primary flapper element 22. A suitable hinge mechanism would be provided between the primary and secondary flapper elements 22, 24. Such an embodiment is illustrated in FIG. 6.

Figure 6:
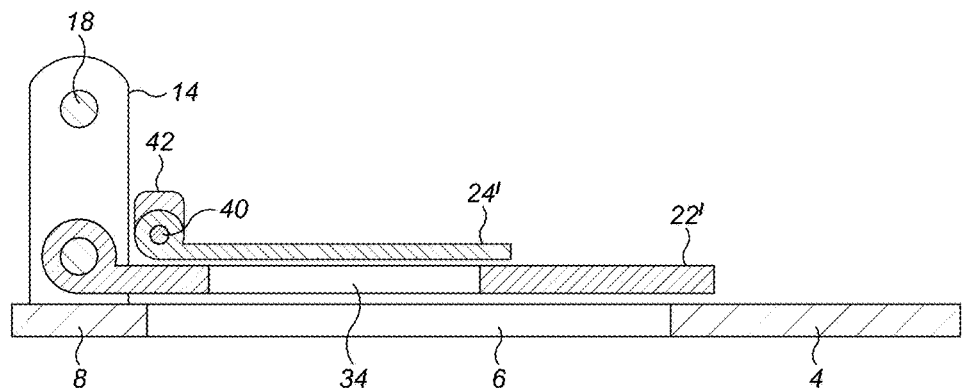
FIG. 6 shows a partial sectional view of a second embodiment of the disclosure taken along a vertical centre line of the check valve perpendicular to the hinge of the check valve.

In FIG. 6, the secondary flapper element 24' is pivotally mounted about a hinge pin 40 mounted between mounting posts 42 provided on an upper surface 44 of the primary flapper element 22'.

Figure 7:
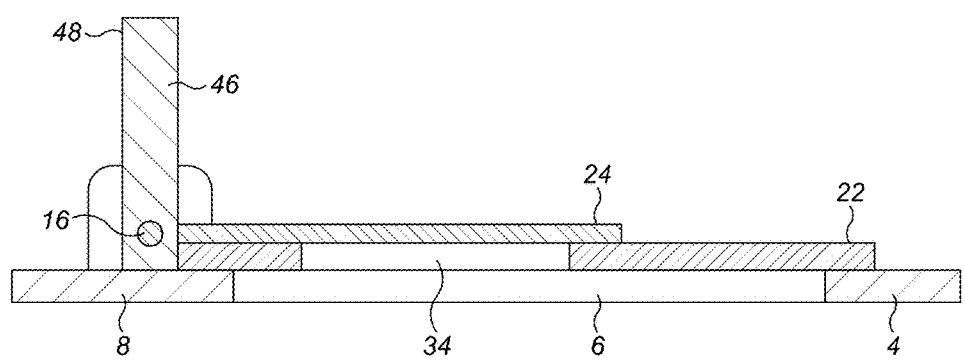
FIG. 7 shows a partial sectional view of a third embodiment of the disclosure taken along a vertical centre line of the check valve perpendicular to the hinge pin.

Also, while in the embodiment disclosed the stop element is in the form of a stop pin 18, other stop elements may be used. Such stop elements may extend between the mounting posts 14, or extend upwardly from the central web 8 of the valve housing 4. In one embodiment, as illustrated schematically in FIG. 7, the stop element may comprise a post 46 extending upwardly from the central web 8, the post 46 having stop surfaces 48 provided in appropriate positions for engaging the respective secondary flapper elements 24. The post 46 may therefore be positioned generally centrally of the web 8. The hinge pin 16 may then extend through, or from both sides of, the post to the mounting posts 14.

The invention claimed is:

1. A check valve comprising:
   a valve housing defining a pair of valve openings;
   a pair of flappers pivotably mounted for rotation relative to the housing between an open position in which they permit fluid flow through the respective valve openings and a closed position in which they prevent fluid flow through the valve openings; and
   a stop element arranged such that the flappers will contact the stop element in their open positions; wherein:
   each flapper comprises a primary flapper element pivotally mounted to a hinge pin extending across the valve, and at least one secondary flapper element;
   the primary flapper element further comprises at least one flapper opening formed therethrough; and
   the at least one secondary flapper element is pivotally mounted such that the at least one flapper element may rotate relative to the primary flapper element for opening and closing the at least one flapper opening in the primary flapper element.

2. The check valve as claimed in claim 1, wherein the at least one secondary element is pivotally mounted to the hinge pin.

3. The check valve as claimed in claim 2, wherein the primary and secondary flapper elements are provided with mounting lugs for mounting the elements to the hinge pin.

4. The check valve as claimed in claim 1, wherein the least one secondary flapper element is pivotally mounted to the primary flapper element.

5. The check valve as claimed in claim 1, wherein the stop element comprises an element extending across the valve between mounting posts.

6. The check valve as claimed in claim 5, wherein the hinge pin and the stop element are mounted between the mounting posts.

7. The check valve as claimed in claim 1, wherein the stop element comprises an element mounted to and extending away from a central region of a web of the valve housing extending between the valve openings.

8. The check valve as claimed in claim 1, wherein each flapper comprises a single flapper opening and a single secondary flapper element.

9. The check valve as claimed in claim 1, wherein the secondary flapper element is a generally planar or plate-like element.

10. The check valve, as claimed in claim 1, wherein the secondary flapper element is configured to engage with a surface of the primary flapper element around the flapper opening to close the flapper opening.

11. The check valve as claimed in claim 1, wherein the flapper opening is offset from a center of the primary flapper element in a direction towards the hinge pin.

12. The check valve as claimed in claim 1, wherein the secondary flapper element is thinner than the primary flapper element.

13. The check valve as claimed in claim 1, wherein the primary and secondary flapper elements are formed from a same material.

* * * * *